(12) United States Patent
Burkart et al.

(10) Patent No.: US 7,634,783 B2
(45) Date of Patent: Dec. 15, 2009

(54) SCANNING DEVICE FOR OPTICAL DISCS

(75) Inventors: Harald Burkart, VS-Schwenningen (DE); Rolf Dupper, Villingen-Schwenningen (DE); Guenter Tabor, Villingen-Schwenningen (DE)

(73) Assignee: Thomson Licensing, Boulone-Billancourt (FR)

( * ) Notice: Subject to any disclaimer, the term of this patent is extended or adjusted under 35 U.S.C. 154(b) by 574 days.

(21) Appl. No.: 11/452,039

(22) Filed: Jun. 13, 2006

(65) Prior Publication Data
US 2006/0291365 A1 Dec. 28, 2006

(30) Foreign Application Priority Data
Jun. 27, 2005  (EP)  ................... 05105700

(51) Int. Cl.
*G11B 7/08* (2006.01)
(52) U.S. Cl. ...................... 720/681; 720/674
(58) Field of Classification Search .......... 720/681–687, 720/674; 369/44.14–44.24, 44.32
See application file for complete search history.

(56) References Cited

U.S. PATENT DOCUMENTS 5,663,843 A  9/1997  Ezawa et al.
5,696,753 A  12/1997  Okushita
6,920,639 B2 * 7/2005  Sogawa et al. .............. 720/685
2001/0050899 A1  12/2001  Iot et al.
2004/0205793 A1  10/2004  Lu et al.

FOREIGN PATENT DOCUMENTS

| EP | 0872832 | 10/1998 |
| EP | 1471511 | 10/2004 |
| JP | 09219032 A * | 8/1997 |
| JP | 2003296954 A * | 10/2003 |
| JP | 2004005824 A * | 1/2004 |

OTHER PUBLICATIONS

Search Report Dated Nov. 25, 2005.

* cited by examiner

*Primary Examiner*—William J Klimowicz
(74) *Attorney, Agent, or Firm*—Robert D. Shedd; Harvey D. Fried; Patricia Verlangieri

(57) ABSTRACT

The invention relates to a scanning device for optical discs, having an adjustable scanning unit tensioned against a carrier with a spring. For minimizing the structural space for the spring and avoiding separate fixing elements, the spring is formed as a dip spring, having an elongated spring limb and a bearing limb formed transversely with respect to the latter, which clip spring impinges at one of its ends with the bearing limb on the carrier with a contact force and is supported at its other end at a distance from the impingement location on the housing.

8 Claims, 3 Drawing Sheets

Section V-V

SCANNING DEVICE FOR OPTICAL DISCS

FIELD OF THE INVENTION

This application claims the benefit, under 35 U.S.C. § 119 of European Patent Application 05105700, filed Jun. 27, 2005.

The invention relates to a scanning device for optical discs, in particular for arrangement in an appliance for reading from and/or writing to optical discs, also referred to hereinafter as discs or storage media, the scanning device reading or storing information or data in at least one track of the respective optical disc. Optical discs are understood to be, in particular, compact discs known as CDs, digital versatile discs known as DVDs, CD-ROMs or DVD-ROMs or rewritable CDs or DVDs.

BACKGROUND OF THE INVENTION

A scanning device has an optical housing and an optical scanning unit known as an actuator. The optical housing can be moved like a slide obliquely or perpendicularly to the respective recording track of a disc-type optical recording medium (optical disc) and is known as a pick-up. It can be moved in a manner driven by electric motor with high speed and high positioning accuracy, in association with a short access time to different locations on the recording medium. The actuator emits a laser beam onto the recording medium and receives the beam reflected from there. The scanning unit having a focusing lens is mounted in an adjustable manner with a disc-type carrier on the housing, which is moveable on guide rods, in order to be able to orient the focusing lens with regard to the optical path of the optical housing. This last is necessary because the scanning device has a series of optical components for directing and orienting the laser beam on the path to the respective recording medium and from the latter to a detector, which, just like the mechanical parts that hold and connect these, have specific manufacturing and assembly tolerances.

In order that the respective optical disc can be illuminated in a positionally accurate manner and its data can be communicated precisely to the detector, provision is made for aligning the focusing lens during assembly of the scanning device by changing the inclination of the scanning unit, as is described for example in EP 0649130 A, EP 0872832 A and US 2001/0050899 A. In this case, the inclination is changed by means of the carrier about a virtual axis, said carrier resting with at least one sliding area on at least one carrying area integrally formed on the optical housing. The areas are formed in particular in spherical or cylindrical fashion, and the carrier is tensioned onto the carrying area with an adjusting screw arranged eccentrically on the housing and with a spring means arranged eccentrically and can be adjusted by turning the adjusting screw.

Tension springs and leaf springs are used as the spring means. The scanning device according to US 2001/0050899 A is provided with a leaf spring which is bent in a U-shaped manner, is fixed with one of its two limbs with a fixing section on the housing and bears elastically on the carrier with its other limb, the two limbs being inclined relative to the fixing section and the limb that bears on the carrier exerting an elastic contact force on the carrier, which force is inclined in its direction in relation to the axis of the adjusting screw. As a result, the contact force exerted on the carrier has a component perpendicular to the carrier and a component parallel to the latter, so that it is possible to set the angle of inclination of the carrier uniformly and with high sensitivity. The fixing section of the leaf spring is preferably established by a fixing screw on the housing. On account of the very small dimensions of the scanning unit, the positioning and fixing of the spring means is made more difficult, especially as the scanning unit is not fully accessible from all sides. Consequently, it may be regarded as disadvantageous that the leaf spring described requires a separate fixing element and increased assembly costs are incurred. Moreover, the leaf spring requires a structural space determined by its extent over and alongside the carrier. It is an object of the invention to improve a scanning device of this type.

SUMMARY OF THE INVENTION

According to the invention, the spring means which tensions the carrier with the scanning head as scanning unit onto the optical housing of a scanning device in interaction with an adjusting screw is a clip spring with an elongated spring limb and a bearing limb formed transversely with respect to the latter, which clip spring impinges at one of its ends with the bearing limb on the carrier with a contact force and is supported at its other end at a distance from the impingement location on the housing, this support being free of separate fixing means. The adjusting screw is representative here of other adjusting apparatuses such as wedge arrangements or the like, which may also be provided with a latching apparatus, if required. A clip spring as described does not require a relatively large structural and assembly space. It can be produced in a simple manner, can be assembled easily and causes only low costs.

Preferably, the clip spring acts in a pretensioned manner with its bearing limb on the side remote from the housing on the carrier, in particular on an attachment formed on the latter, and impinges on the carrier in the direction towards the housing with a contact force, so that the carrier is tensioned against the sliding areas. Said bearing limb is formed for example on a hook-shaped angular portion formed on the spring limb.

The clip spring is arranged in such a way that its supporting location on the housing is given on the side of the adjusting screw acting on the carrier and thus on that side of the sliding areas which is remote from the angular portion. This results in a considerable distance between the supporting location of the clip spring on the housing and the location where it acts on the carrier, thereby enabling a gentle setting movement of the carrier by the adjusting screw in a manner free of jerking.

In order to minimize its structural space, the clip spring is advantageously guided with its spring limb in a groovelike depression formed on the housing, the hook-shaped angular portion being angled relative to the spring limb and projecting from the depression at an acute angle with respect to the housing.

The spring limb is preferably bent over in barbed fashion for its support on the housing towards the side remote from the angled hook-shaped angular portion and clamped with the bent-over end piece in an abutment formed on the housing. In this case, the abutment is formed by boundary areas of an anchoring channel which is inclined relative to the groovelike depression or the housing surface and whose inclination is less than that of the end piece. Said channel, the cross section of which is considerably larger than that of the end piece, has a supporting area for a region of the arcuately curved part of the bent-over end of the spring limb and a bearing edge for the inner side of the bent-over end piece, the latter advantageously being formed on a shoulder. When establishing the end piece in this anchoring channel, the spring limb is pressed into the depression and tensioned against the latter and thereby clamped with the end piece in the anchoring channel.

The spring limb thereby lies in a pretensioned manner in the depression and can be raised elastically at a distance from the abutment against its spring force and be brought into engagement with the carrier.

The carrier extends parallel to a virtual axis on sliding blocks which are formed on the housing and on the free end sides of which the sliding areas are situated. In this case, the sliding blocks simultaneously serve as guide means for the carrier during an adjusting movement about the virtual axis and for this purpose have lateral guide areas for the carrier on their side facing the carrier.

The sliding areas are preferably arranged and/or formed concavely relative to the carrier on the housing, so that the carrier is received in troughlike fashion with its counter-sliding areas. In this case, the sliding areas may be configured in spherical or cylindrical fashion. Said sliding areas and the counter-sliding areas bearing in a positively locking manner are advantageously formed in cylindrical fashion, however, in order to permit an adjusting movement of the carrier in only one defined direction. In the case of the sliding areas at the housing, as an alternative to the cylindrical embodiment, a plane prismatic embodiment is also possible, on the inclined flanks of which the cylindrical counter-sliding areas bear linearly parallel to the virtual axis.

BRIEF DESCRIPTION OF DRAWINGS

The invention is explained below on the basis of an exemplary embodiment. In the associated drawings.

DETAILED DESCRIPTION

Figure 1:
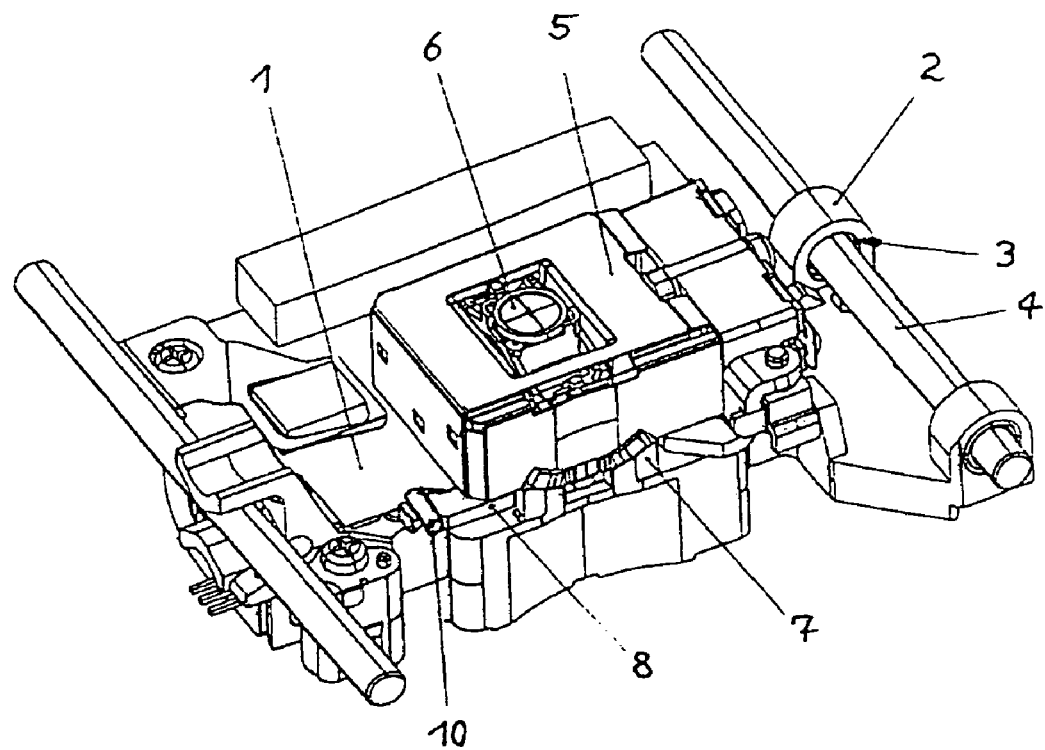
FIG. 1 shows a scanning device according to the invention in a perspective illustration.

FIG. 1 shows an optical scanning device having an optical housing 1 made of diecast zinc or plastic with guide blocks 2 for a linear movement, into which are introduced holes 3 for arrangement on a guide rod 4, and with a scanning head 5 with a focusing lens 6. The scanning head 5 is fixedly connected to a carrier 8, which is partially concealed by said scanning head and is fixed in an adjustable manner on the housing 1 on sliding blocks 7, and said scanning head is tensioned together with the carrier 8 against the sliding blocks 7 by means of an adjusting screw 9 (FIG. 2) supported on the housing 1 and by means of a clip spring 10 made of spring steel wire. The adjusting screw 9 and the clip spring 10 in each case act on the carrier 8 at a distance from the sliding blocks 7 and are in this case arranged in diagonally opposite fashion.

Figure 2:
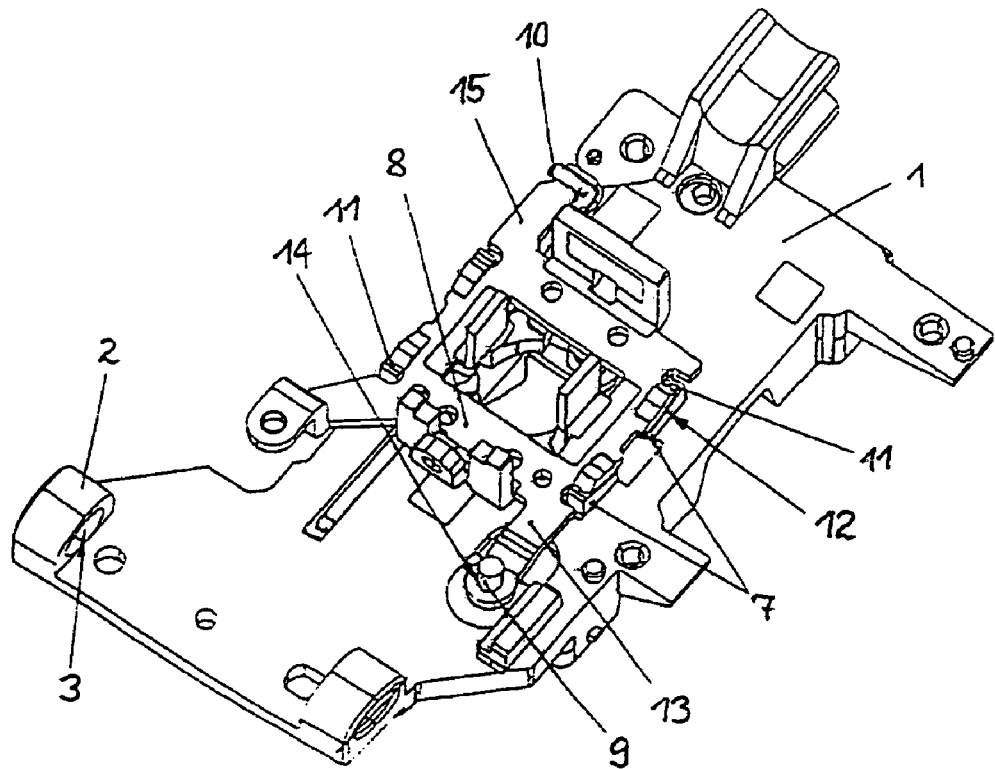
FIG. 2 shows the optical housing of the scanning device from FIG. 1 with the carrier for the scanning head in a perspective illustration.

FIG. 2 clearly reveals the mounting of the carrier 8 on the housing 1. The sliding blocks 7 integrally formed on the housing 1 are provided on their top sides with concavely curved cylindrical sliding areas 11 for receiving the carrier 8, which for this purpose has counter-sliding areas 12 which correspond to the sliding areas 11 and are formed in convexly curved and cylindrical fashion and bear on the sliding areas 11 in a positively locking manner. The adjusting screw 9 is in engagement with a lug 13 integrally formed on the carrier 8, said lug having a threaded hole 14 for this purpose. On that side of the carrier 8 which is remote from the adjusting screw 9, a further lug 15 is formed diagonally with respect to the lug 13, the clip spring 10 anchored on the housing 1 acting on that side of said further lug which is remote from the housing 1 at a distance from the sliding areas 11, said clip spring thereby pressing the carrier 8 onto the sliding areas 11 in a pretensioned manner. The inner side areas of the sliding blocks 7 that project at the housing 1 and face the carrier 8 constitute guide areas for the carrier 8 which prevent the latter from tilting.

Figure 3:
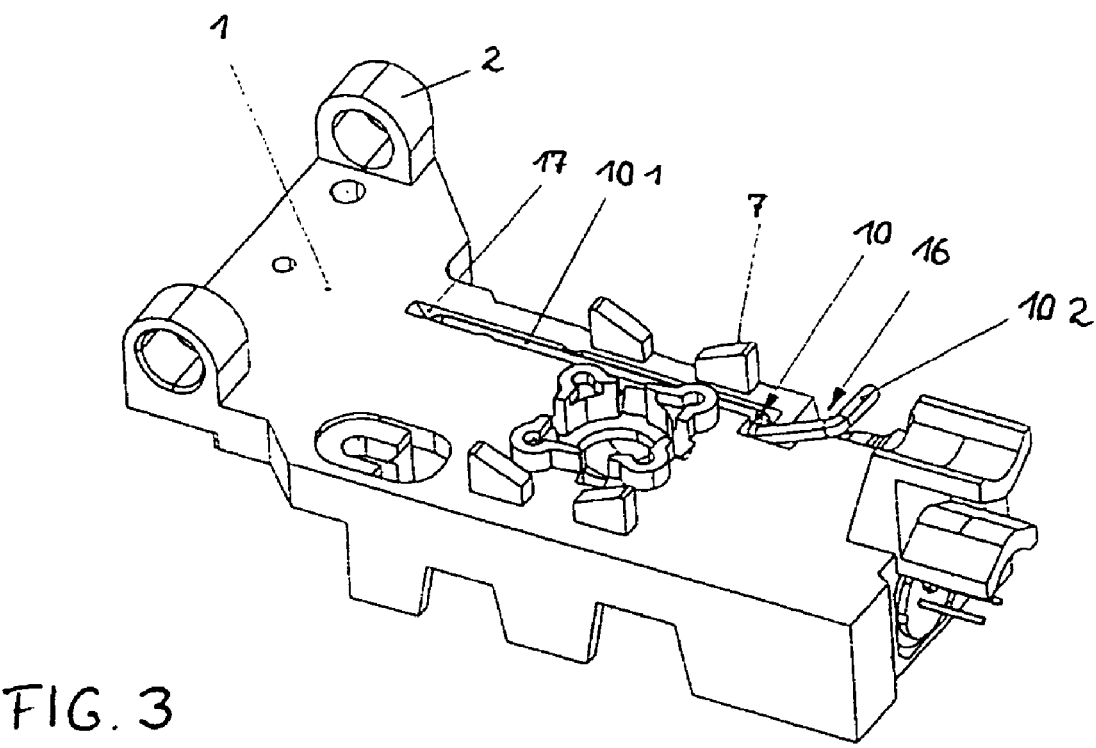
FIG. 3 shows the optical housing of the scanning device with a clip spring arranged on said housing.
Figure 4:
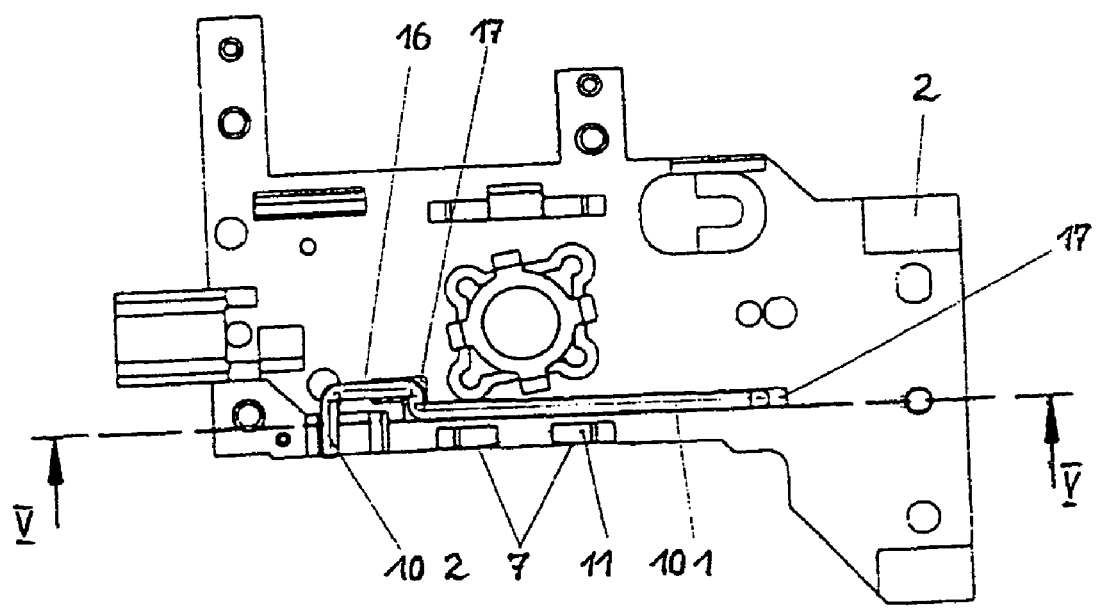
FIG. 4 shows a plan view of the optical housing, rotated through 180° relative to FIG. 3.

FIGS. 3 and 4 illustrate the arrangement and embodiment of the clip spring 10. The latter has an elongated spring limb 101 and a bearing limb 102 which is formed transversely with respect to the latter and with which said clip spring presses the carrier 8 (not illustrated here) onto the housing 1. The bearing limb 102 is formed on a hook-shaped angular portion 16 formed on the spring limb 101. It can be discerned in FIG. 3 in particular that the spring limb 101 is guided in a groovelike depression 17 formed on the housing 1, and that the hook-shaped angular portion 16 is angled relative to the spring limb 101 and projects from the depression 17 at an acute angle with respect to the housing 1 in order in this way to engage over the lug 15 with the bearing limb 102.

Figure 5:
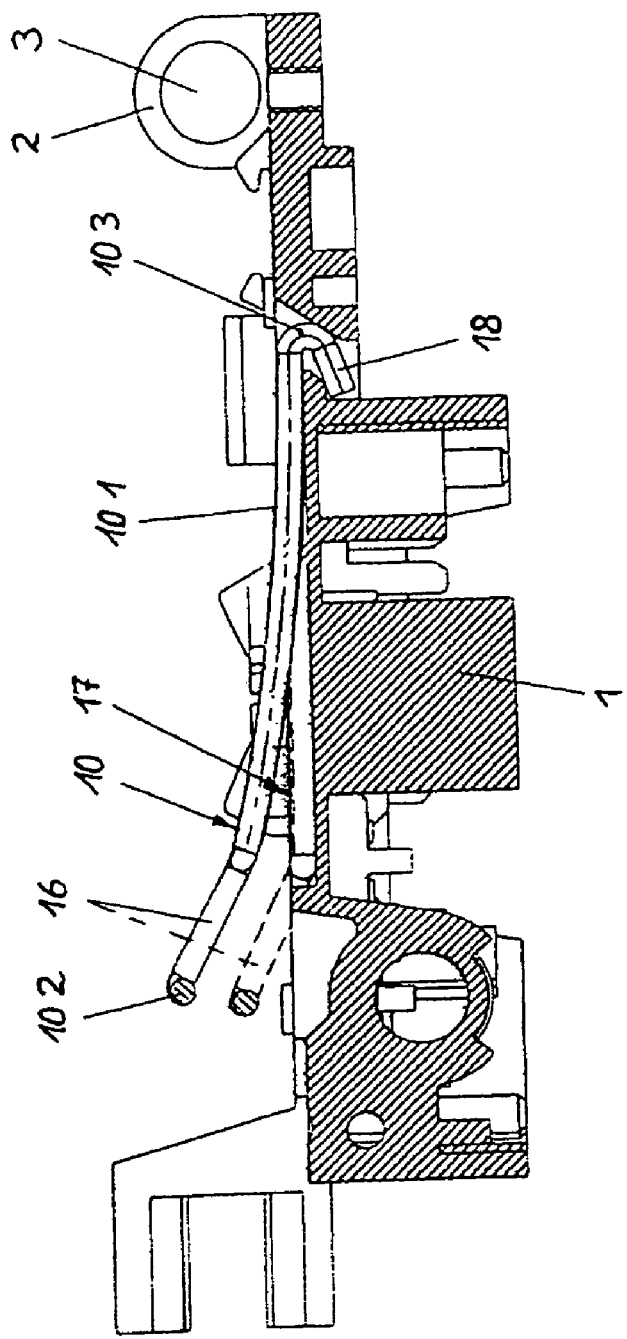
FIG. 5 shows a section V-V through the housing with a clip spring having been arranged.

The spring limb 101 is bent over in barbed fashion in a curvature part 103 at its support-side end in the depression 17 in the direction towards the side remote from the angled hook-shaped angular portion 16 and is clamped with the bent-over end piece 18 in an abutment formed on the housing 1, which is shown in the section V-V illustrated in FIG. 5. The illustration shows using broken lines the arrangement of the clip spring 10 in the depression 17 out of engagement with the lug 15 of the carrier 8 in accordance with FIG. 3, the clip spring 10 lying in the depression 17 already in a pretensioned manner in the direction towards the housing 1 on account of its clamping anchoring in the housing 1. The illustration shows using solid lines the clip spring 10 which is bent out elastically from the depression 17 and, in such a position, is in engagement with the lug 15 (not illustrated) and has an increased pretensioning in particular as a result of the elastic bending of the spring limb 101.

Figure 6:
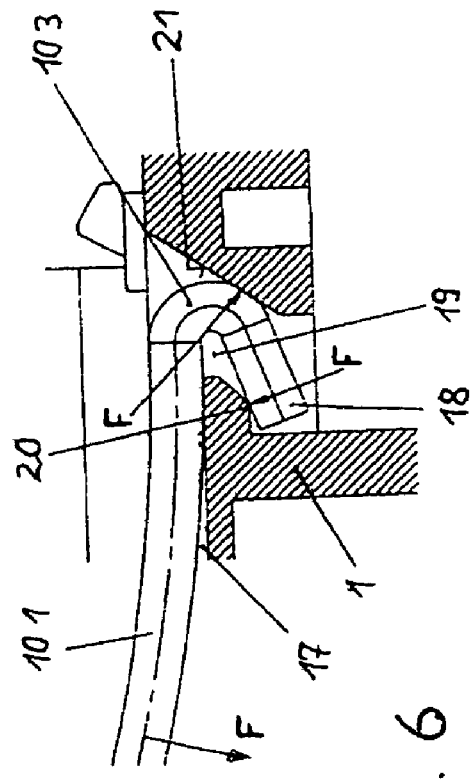
FIG. 6 shows the anchoring of the clip spring in the housing, in an enlarged fashion relative to FIG. 5.

The clamping anchoring itself is illustrated in an enlarged manner in FIG. 6. The abutment which is formed in the housing 1 and serves for anchoring is an anchoring channel 19 which is inclined relative to the housing surface in the direction of the bent-over end piece 18, but whose inclination is less than that of the end piece 18 with respect to the spring limb 101. The anchoring channel 19 has a bearing edge 20 for the inner side of the end piece 18, which is produced by a gradation in the anchoring channel 19, and offers a supporting area 21 for the region of the arcuate curvature part 103 of the clip spring 10. As a result of the arrangement of the bent-over end in the anchoring channel 19, on account of the difference in inclination between the latter and the bent-over end piece 18 and the bearing of the spring limb 101 in the depression 17, the curvature part 103 is slightly bent up elastically as a result of the generation of a stress in the clip spring 10 which, in the spring limb 10, brings about the abovementioned pretensioning in the spring limb 10. The pretensioning forces F are indicated.

If the position or, in particular, the orientation of the focusing lens 6 has to be corrected, the carrier 8 with the scanning head 5 can be rotated about a virtual axis in a manner sliding on the sliding areas 11, whereby its inclination relative to the housing 1 changes. This correction is effected by an actuation of the adjusting screw 9, the clip spring 10 tensioning the carrier 8 onto the sliding areas 11.

The invention claimed is:

1. Scanning device for optical discs, having an optical housing with integrally formed sliding areas for receiving a scanning unit with a carrier with a scanning head arranged thereon, which scanning unit is provided with counter-sliding areas and is adjustable about a virtual axis, having at least one adjusting apparatus which is supported on the housing and acts on the carder, and having at least one clip spring with an elongated spring limb guided in a groovelike depression formed on the housing and a bearing limb formed on a hook-shaped angulars, portion of the spring limb and transversely with respect to the latter spring limb, the angular portion being angled relative to the spring limb and projecting from the depression at an acute angle with respect to the housing, the spring impinging at one of its ends with the bearing limb on the carrier on that side of the sliding areas which is remote from the adjusting apparatus and pressing it against the sliding areas of the housing, and the spring being supported at its other end at a distance from where it impinges on the housing, wherein the spring limb is bent over in barbed fashion in a curvature part at its support-side end towards the side remote from the hook-shaped angular portion and is clamped with a bent-over end Piece in an abutment formed on the housing.

2. Scanning device according to claim 1, wherein the abutment is an anchoring channel which is inclined to the surface of the housing and whose inclination is less than that of the end piece with respect to the spring limb.

3. Scanning device according to claim 2, wherein the anchoring channel has a supporting area for the curvature part of the clip spring and a bearing edge for the inner side of the bent-over end piece.

4. Scanning device according to claim 1, wherein the clip spring is formed from spring steel wire.

5. Scanning device according to claim 1, wherein the sliding areas arranged on the housing are formed on sliding blocks which form lateral guide areas for the carrier on their side facing said carrier.

6. Scanning device according to claim 1, wherein the sliding areas are formed concavely relative to the carrier.

7. Scanning device according to claim 1, wherein the counter-sliding areas formed on the carrier correspond in Their fan to the sliding areas of the housing and bear on them in a positively locking manner.

8. Appliance for reading from and/or writing to optical storage media, comprising a scanning device according to claim 1.

* * * * *

UNITED STATES PATENT AND TRADEMARK OFFICE
CERTIFICATE OF CORRECTION

PATENT NO. : 7,634,783 B2 Page 1 of 1
APPLICATION NO. : 11/452039
DATED : December 15, 2009
INVENTOR(S) : Burkart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Ninth Day of November, 2010

David J. Kappos
*Director of the United States Patent and Trademark Office*